No. 814,512. PATENTED MAR. 6, 1906.
W. B. BROWN.
OPTOMETER.
APPLICATION FILED MAR. 25, 1905.
4 SHEETS—SHEET 4.
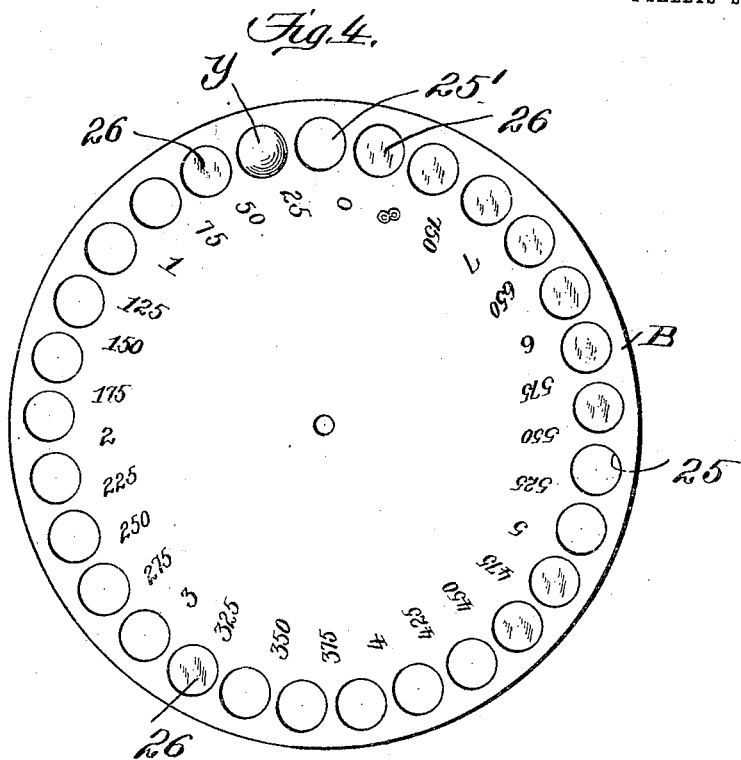
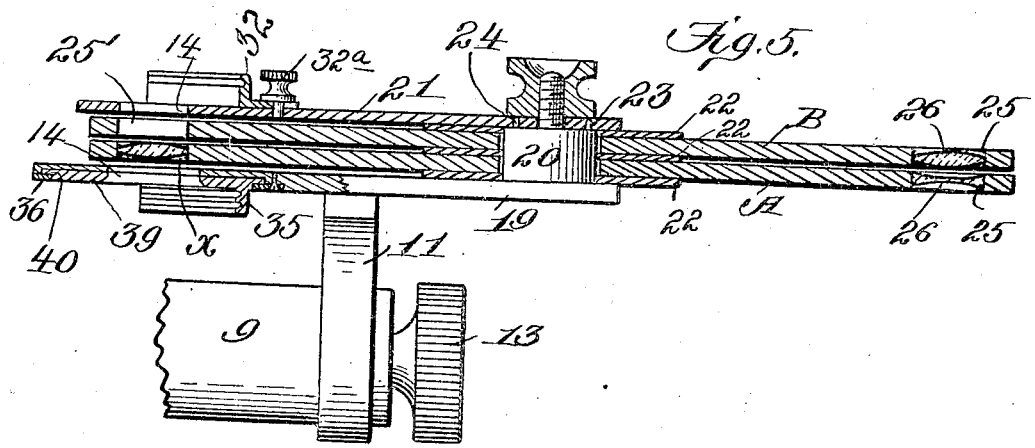
Witnesses:
E. F. Kesler
James L. Norris, Jr.
Inventor
William B. Brown
By James L. Norris.
Atty.

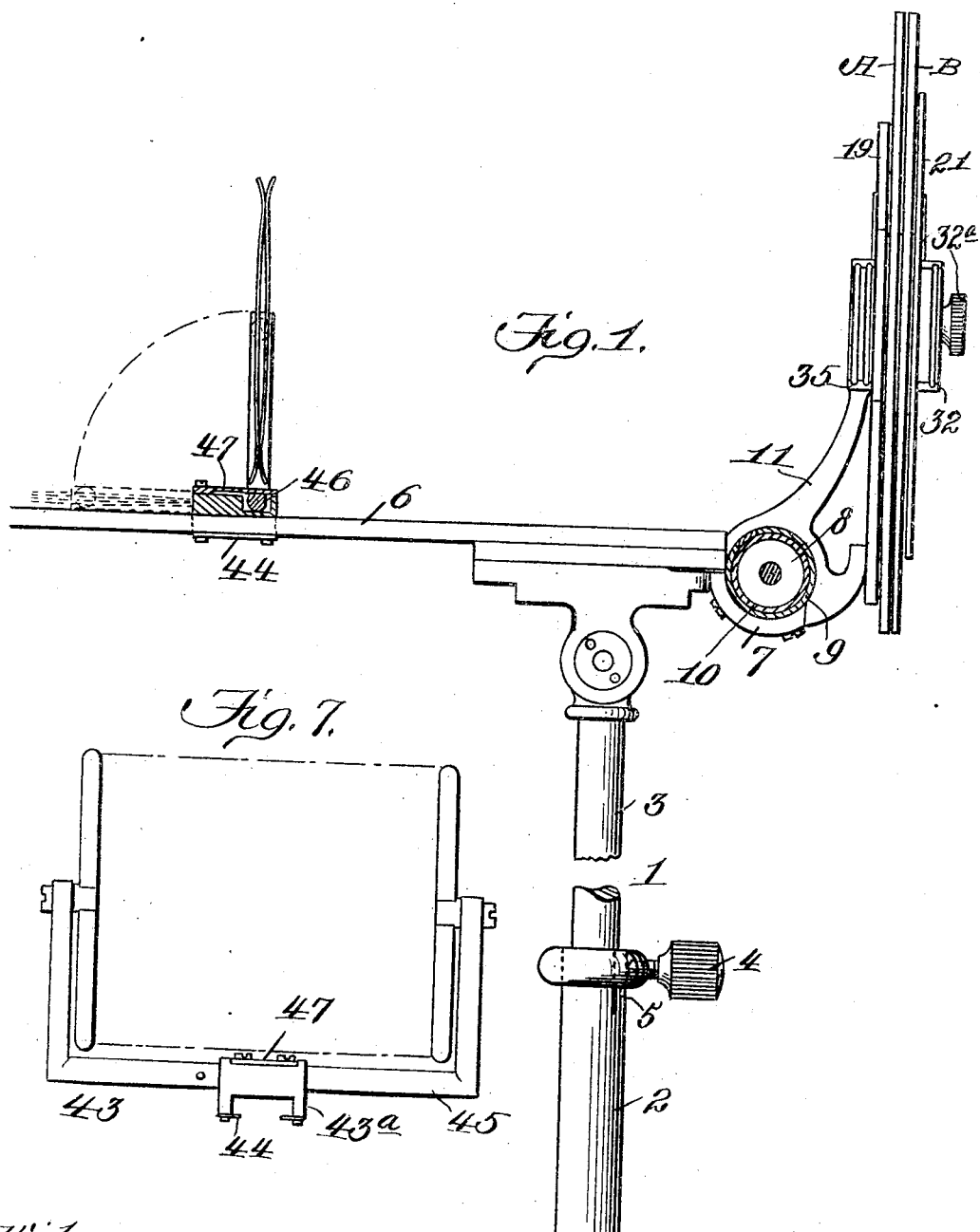

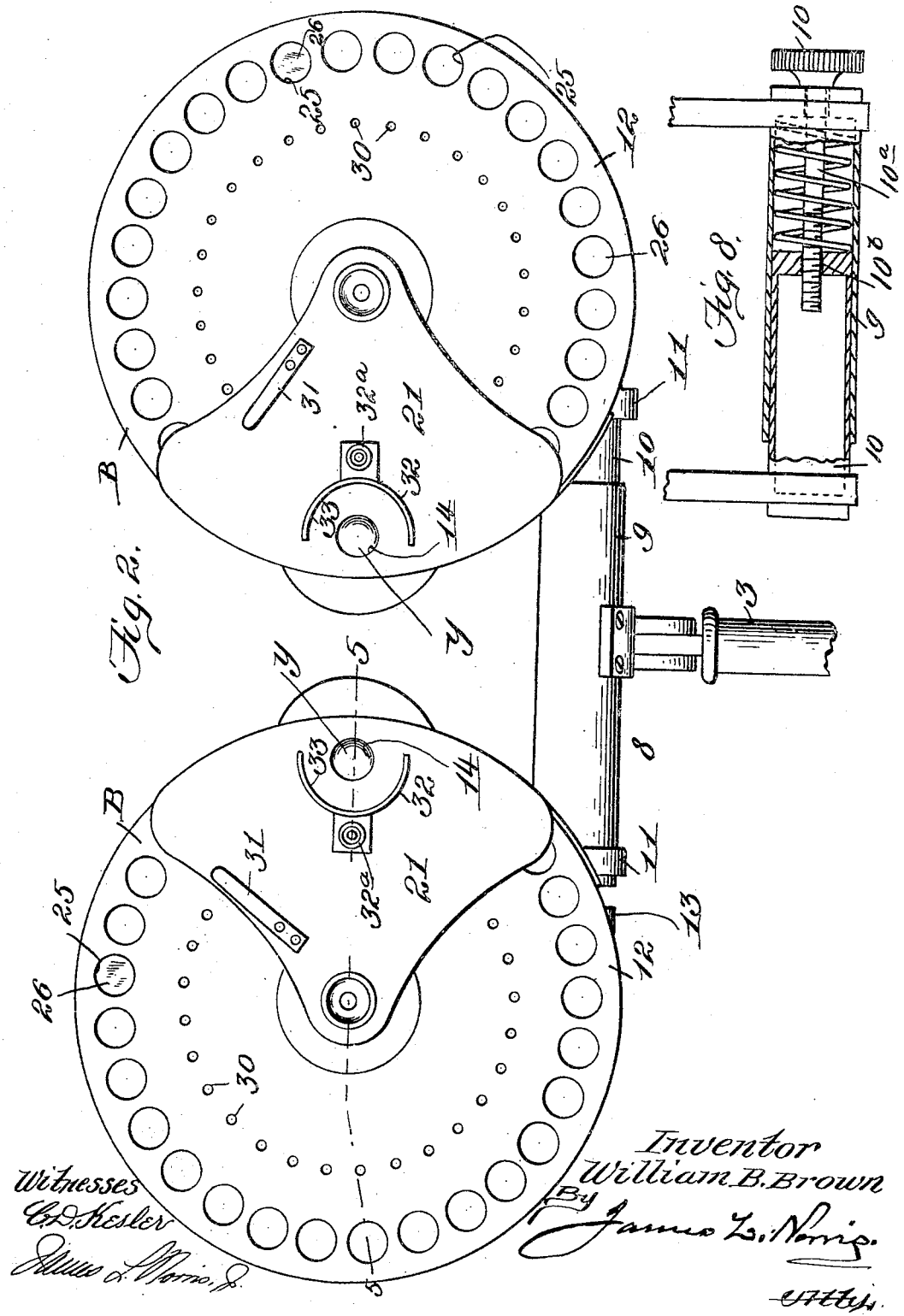

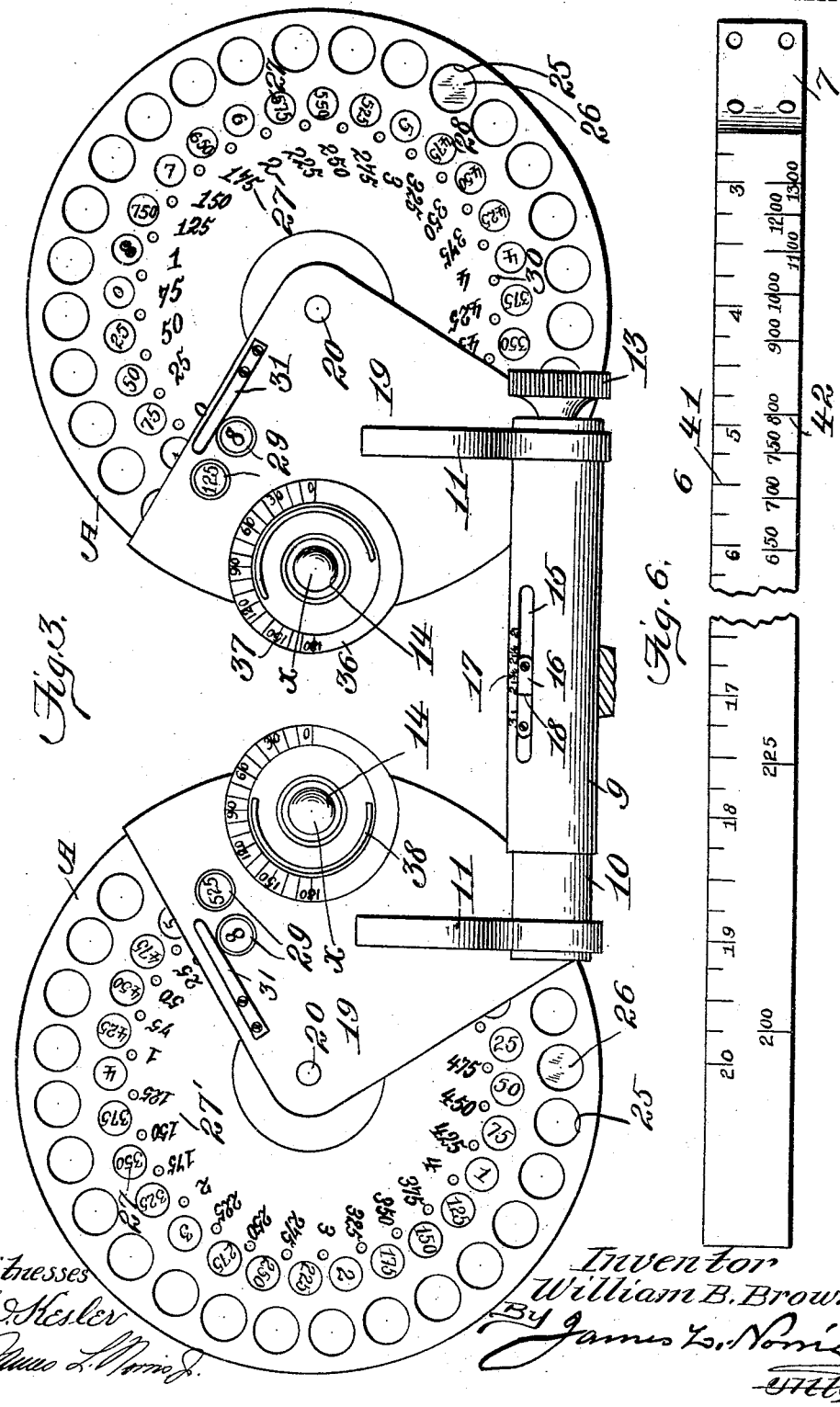

UNITED STATES PATENT OFFICE.

WILLIAM B. BROWN, OF BALTIMORE, MARYLAND.

OPTOMETER.

No. 814,512.      Specification of Letters Patent.      Patented March 6, 1906.

Application filed March 25, 1905. Serial No. 252,049.

*To all whom it may concern:*

Be it known that I, WILLIAM B. BROWN, a citizen of the United States, residing at Baltimore city, in the State of Maryland, have invented new and useful Improvements in Optometers, of which the following is a specification.

My invention relates to improvements in optometers, and has for its object to provide an instrument of this kind embodying a novel arrangement and combination of parts whereby various optical tests may be carried out with accuracy and facility; and said invention has for its object, furthermore, to improve such instruments in details of construction, To the ends stated the invention consists of an optometer embodying the features hereinafter set forth and claimed, reference being made to the accompanying drawings, wherein—

Figure 1 is a view, partly in elevation and partly in central vertical section. Fig. 2 is a front view. Fig. 3 is a rear view. Fig. 4 is a face view of one of the lens-disks. Fig. 5 is a sectional view taken on the line 5 5 of Fig. 2. Fig. 6 is a plan view of the graduated lens-disk-carrying and test-card-carrying arm. Fig. 7 is a detail elevation of the test-card holder. Fig. 8 is a detail sectional view illustrating the plural-part lens-disk supporting and adjusting element.

In the said drawings the reference-numeral 1 designates a telescopic standard upon which the optometer is pivotally suspended, as and for the purpose hereinafter described. The said telescopic standard is composed of two members, that 2 being hollow and provided with means, such as screw-holes, whereby it may be rigidly affixed to a table-top or other support. Within the hollow member 2 the member 3 of the standard is fitted, and it may be adjusted to different positions therein to position the lens-disks and eye-openings to different heights, so that they may be brought into coincidence with the eyes of the patient. The member 3 of the standard is held in any position of adjustment by a suitable clamping means, that illustrated consisting of a thumb-screw 4, working against a spring clamping-tongue 5, formed by slitting the upper end of the fixed member of the standard.

Pivotally mounted at the upper end of the member 3 of the standard is the graduated lens-disk and test-card carrying arm 6, the pivotal connection exerting such frictional resistance to movement that combined with the weight and proportion of parts said arm and the lens-disk and other appurtenances carried thereby will be balanced to the end that the optometer as an entirety will sustain any position of adjustment on the pivot that may be imparted thereto by the operator, and in this way different inclinations of the lens-disk and test-card with respect to the eyes of the user may be quickly and easily obtained and maintained during the testing of the eyes of the patient.

The capability of the instrument being adjusted to different inclinations, as set forth, is valuable in that by reason thereof in the test the patient may view the test-card at that angle of inclination which is habitual in reading, and therefore tests in all respects most suited to individual cases may be had. Ordinarily in reading the matter being read is held below the level of the eyes and is viewed in that angular relation, but the degree of this angularity is different with different persons, and by so mounting my improved optometer that the test-card and lenses may be brought to different angular relation to the eyes the peculiarities of patients in this respect are provided for.

The arm 6 at one end and near the point of pivotal connection with the standard is provided with a seat 7, in which is fitted and secured, as by means of screws, a plural-part lens-disk supporting and adjusting element 8. The two parts 9 10 of this element sustain a sliding relation to each other, one part fitting and moving within the other, as shown. The parts 9 and 10 are adjusted with relation to each other in the illustrated example of device shown by means of a screw $10^a$, the stem of which passes loosely through the end of the part 9 and the threaded end of which is in engagement with a screw-threaded socket $10^b$ in the part 10, whereby upon rotation of the milled end $10^c$ of said screw the parts 9 and 10 may be adjusted relatively to each other to bring the lens-disks supported thereby nearer to or farther from each other. Any position of adjustment of said parts 9 and 10 with relation to each other effected by said screw is maintained by a spiral spring $10^d$, arranged within the part 9, surrounding the screw and bearing against the end of the part 10. Independent bracket-arms 11 are rigidly connected to or formed with the parts 9 and 10, and in the manner to be hereinafter described said brackets carry the lens-disks 12 and appurtenances thereof.

The numeral 13 designates a screw by means of which the parts 9 and 10 are adjusted with relation to each other to adjust the distance between the eye-openings 14 and lenses to accord with the pupilary distance between the eyes of the patient.

One part of the adjusting mechanism, as 9, is provided with an elongated slot 15, in which may move a stop 16, secured to the other member, as 10, and by which the extremes of adjustment of said parts are limited. The slotted part 9 is provided along one edge of the slot with a scale 17, having indicia designating inches and fractions of inches. The indicia of the scale may be altered at will. That shown includes marks to designate two inches and three inches and the fractions therebetween, as it is ordinarily found that the pupilary distance between the eyes of patients is not greater than three inches nor less than two inches. The stop 16 is provided with an index-pointer 18, which may consist of a line and which is so adjusted with relation to the scale 17 and the scale is so disposed with reference to the eye-openings 14 that when the pointer comes opposite any indication on the scale 17 that designation will be the measure of the distance between the eye-openings 14, and consequently the measurement of the pupilary distance between the eyes of the patient.

Rigidly connected with the bracket-arms 11 are plates 19, to which are secured journal-studs 20, on which are mounted lens-disks A and B and plates 21. Washers 22 are interposed between the said plates 19, disks A and B, and plates 21, as shown. The plates 19 and 21 are provided with eye-openings 14, and the plates 21 are provided with dowel-openings 23, into which dowels 24 on the journal-studs 20 fit in order to insure that the eye-openings 14 in said plates shall be in accurate register with the eye-openings 14 in the plates 19 and also with the various lenses in the lens-disks. The disks A and B are provided with series of openings 25, in which are arranged series of lenses 26, and each disk is provided with an additional unoccupied opening 25'. The lenses 26, incorporated with the disks A, are concave or minus lenses of varying degree of power. Those incorporated in the disks B are convex or plus lenses of varying degree of power. In each disk A in addition to the series of concave lenses there is embodied at the end of the series a convex or plus lens $x$, and in the disks B at the end of the series of convex lenses there is embodied a concave or minus lens $y$, the value and importance of which additional convex lens in the concave lens-disk and concave lens in the convex lens-disk will be hereinafter referred to.

Appropriated to each convex lens in the series is the dioptric value thereof indicated in numbers and fractions of numbers arranged in scales 27, arranged on the disks B, and similarly appropriated to the dioptric value of the concave or minus lenses are numerals arranged in the scales 27' on the disks A. The dioptric value-numerals on one disk are shown in characters having a color distinguished from the color of the numbers on the other disk, so that the operator being informed of the color of numbers appropriated to one of the disks may not be confused by the similarity of numerals.

In order that the dioptric value-numerals of the convex lens-disks B may be visible, concentric series of openings 28 coincident with the line of such numerals are formed in the concave lens-disks A, whereby the position of a convex lens of any given strength relatively to the eye-openings 14 may be observed by the operator at any time, whereby the positioning of any desired lens in coincidence with the sight-openings is accomplished with much more facility than if the openings were not provided and the operator had to view the dioptric value of the lenses only through the indicator-openings 29, hereinafter referred to. The convex lens $x$, added to the series of concave lenses in the concave lens-disk, will be designated in the series of value-numbers on the concave lens-disk by a character distinguished in matter of color or otherwise from the remainder of such series of numerals, and the concave lens $y$, added to the series of convex lenses in the convex lens-disk, will be similarly indicated by a numeral distinguished from the numerals on said disk appropriated to the convex lenses. In this way all possibility of confusion by the operator is avoided.

The plates 19 are each provided with a pair of indicator-openings 29, with which the dioptric value-numerals arranged on the disks referred to come into register for observation by the operator. The dioptric value-numerals arranged on the lens-disks are so arranged with relation to the lenses and the eye-openings 14 that when a given dioptric numeral appears in an indicator-opening 29 a lens of corresponding value will be in coincidence with the eye-openings referred to. The several disks A and B are provided with indentations 30 appropriated to the dioptric value-numerals arranged thereon, with which indentations spring-pins 31, carried by the plates 19 and 21, coöperate, said pins entering such indentations as the disks are revolved with a delicate pressure, sufficient, however, to inform the operator that a lens is in register with the eye-openings 14 and to retain such lens in such register until the relation is wilfully disturbed. In a sequence of convex lenses of varying power in the convex lens-disks and a sequence of varying power concave lenses in the concave lens-disks various combinations can be effected by positioning any one of the concave lenses in coincidence with the eye-openings 14 and also positioning any one of the convex lenses in line therewith, or combinations of concave and convex lenses may be so positioned.

The capacity of combination of the instrument according to my invention is greatly enlarged without increasing the number of dimensions of the instrumentalities by incorporating in the series of concave lenses in the concave lens-disk a convex lens $x$ and by incorporating in the series of convex lenses in the convex lens-disk a concave lens $y$, heretofore referred to. For instance, when testing with the convex lenses the series in the convex lens-disk in the example of my invention illustrated goes to power 7:50. If this be not strong enough, the convex lens of value 8, contained in the concave lens-disk, is brought into register with the eye-openings, and if this be not of sufficient strength or power the convex lens-disk may be rotated to add to the lens of power 8 a lens of power 1 or any fraction thereof or 2, 3, 4, and so on and any fraction thereof up to 7:50, giving the range of 15:50, and so with respect to a test with the concave or minus lenses. This is a valuable consideration, as without materially increasing the number of lenses or the proportions of the apparatus and without increasing the complexity of the instrument at least double capacity is secured.

The plates 21 are provided with lens-holders 32, consisting, as shown, of semicircular cells provided in their inner walls with grooves 33 to receive lenses, and said holders are detachably connected to the plates 21 in any suitable manner—for example, that shown in the drawings, wherein they are connected by thumb-screws 32ª, engaging said lens-holders and plates. These holders may be removed when desired. When connected to the plates, special lenses—as, for instance, what is known as a "single-test" lens—may be introduced thereinto and the unoccupied lens-openings 25' in the lens-disks brought into register with the eye-openings 14, so that the patient's eyes may be tested for any special purpose while looking only through such single-test lenses. The plates 19 are provided with eye-openings 14 in alinement with the openings 14 in the plates 21, and associated with these openings are special lens-holders 35, which lens-holders are rotatively mounted in the plates 19, and combined therewith and with reference to which said holders rotate are rings 36, provided with graduations 37, corresponding with degrees of a circle, the particular purpose of which lens-holders is to receive lenses for testing the eyes of the patient with reference, for instance, to astigmatism or muscular unbalance, in which test the unoccupied lens-openings in the disks will be brought into register with the eye-openings 14 and the special astigmatism-lens inserted in the holders 35, the patient thus viewing the test-card while looking through the astigmatic lens alone or in combination with any lens in disk A or B. The lens-holders 35, in which the astigmatism-lenses are inserted, may be rotated with reference to the graduated scale 37 until the proper angle has been reached, which angle will be indicated upon the scale by pointers 38. Other special lenses may be inserted in the holders for testing as to any particular defect of eyesight. The lens-holders 35 are connected to bases 39, which are set into counterbored openings or recesses 40 in the plates, in which they are confined by the graduated rings 36 and are capable of rotation with sufficient frictional hold to maintain any position which may be imparted thereto by the operator. The graduated confining-rings 36 are firmly connected to the plates 19 by means of screws or otherwise suitably connected thereto. This particular arrangement enables the lens-holders 35 to be rotatively mounted in the plates and the rings 36 to be set in flush with the surfaces of the plates, no projection or obstructions being formed on the inner faces of the plates or those faces which are next the lens-disks, whereby the plates may be set up close to said lens-disks with just sufficient clearance for the movement of the lens-disks as is desirable. The plates 19 and 21 serve as guard-plates to protect the lenses from perspiration.

Very frequently, and especially in warm weather, the forehead of the patient is in a state of perspiration, which would, except for the guard-plate 21, find its way to the lenses, requiring constant wiping off of the same and the loss of time attendant thereon, and the plate 19 prevents the hands or fingers of the operator or patient coming into contact with and in any way blurring the lenses.

The pivoted arm 6, carrying the lens-disks and the other appurtenances described, is provided on its surface with a scale 41, graduated in inches at one edge, and is provided also with a dioptric scale 42 at its opposite edge. Both of these scales are related to the lenses in the lens-disks, the inch-scale graduation being useful in the distance test. The indicia of the dioptric-scale graduation are arranged at predetermined positions on the arm 6, such positions having a definite relation to the lens-disks in respect to distance therefrom and to a test-card movably arranged upon said arm such that when the patient looks at the test-card through the unoccupied lens-openings in the lens-disks as said card is adjusted to and fro upon the arm the position of the test-card upon the arm at which the patient can best see the test matter of the arm may be ascertained. That indication on the dioptric scale which is nearest the test-card when the latter is in the best position for the eyesight of the patient will designate approximately the dioptric value of the strength of the accommodation and also with or without the proper lens in disk A or B the dioptric value of the eye. The operator will then, having the benefit of this approximate test, adjust the lens-disks until either a lens or combination of lenses corresponding to the approximate indication on the dioptric scale of the arm 6 come into coincidence with the eye-openings, and the test will then be proceeded with to arrive with greater nicety at the dioptric condition of the patient's eyes by a nicer adjustment of the test-card as viewed through lenses or a combination of lenses varying in power from the approximate value indicated by the dioptric scale 42. By the provision of this dioptric scale on the arm 6 the test may proceed with great facility and rapidity, as an approximate diagnosis may be obtained through the medium of the test-card and the dioptric scale, avoiding the necessity of a tedious process of guessing at the probable dioptric value of the lenses with which to commence the process of arriving accurately at the precise dioptric value of the lenses suited to the patient's eyes.

The reference-numeral 43 designates a test-card holder which consists of a slide 43ª, having depending arms which slide against the opposite edges of the arm 6, and springs 44, which hug the lower surface of the arm, to the end that the test-holder may be moved along the arm to any desired position and there held by the friction of the springs. Rotatively mounted in the slide 43ª is a yoke 45, having an angular portion 46, against the flat faces of which a spring 47 engages to hold said yoke in any desired position of adjustment. Swiveled in the arms of the yoke are test-card clasps into which the test-card is inserted and by which it is held. By swiveling the test-card clasps in the yoke a test-card having tests of different character printed on each side of the card may be used with facility, as the clasps may be turned to present either side of the test-card to the view of the patient. When testing by the use of the card, the yoke is adjusted to the position shown in the drawings, Fig. 1. When a test by the card is not desired, the yoke may be swung down and the card moved from the line of view, as illustrated in dotted lines in said figure of the drawings. When the yoke and test-card are swung down, the eye may then be tested for distant vision by using a standard test-card at twenty feet or any other distance. By this arrangement any method of examining may be used.

Having thus described my invention, what I claim is—

1. In an optometer, the combination with a standard, of an arm pivotally mounted on said standard and provided with a dioptric scale, and having lens supporting and adjusting means connected thereto, lens-disks carried by said means at one side of the pivotal connection of the arms with the standard, the lens-disks being simultaneously adjustable in opposite directions with relation to each other through the medium of said means, a test-card holder adjustable on said arm, and a test-card swiveled in said holder, substantially as described.

2. In an optometer, the combination with a standard, of an arm pivotally mounted on said standard and provided with a dioptric scale, and with a seat at one side of its pivotal connection with the standard, a two-part telescopic lens supporting and adjusting device arranged in said seat, lens-disks held by said device and simultaneously and equally adjustable in inward and outward directions, and connections between said disks and the elements of said supporting and adjusting device, substantially as described.

3. In an optometer, the combination of a standard, a graduated lens-disk and test-card carrying arm pivotally mounted thereon, a reversible test-card holder disposed on the said arm, the arm being graduated in inches at one edge and provided with a dioptric scale at its opposite edge, and lens-disks cooperating wth said arm and arranged in pairs, one of said disks carrying a series of convex lenses and also an auxiliary concave lens, and the other of said disks carrying a series of concave lenses and an auxiliary convex lens.

4. In an optometer, the combination of a standard, a graduated lens-disk and test-card carrying arm pivotally mounted thereon, a reversible test-card holder disposed on the said arm, the said arm being graduated in inches at one edge and provided with a dioptric scale at its opposite edge, and lens-disks coöperating with the said arm and arranged in pairs and respectively carrying series of concave and convex lenses.

5. In an optometer, the combination with a standard, of lens-disks supported thereby and arranged in pairs, one disk of each pair having a series of convex lenses and also an auxiliary concave lens, the other disk of each pair having a series of concave lenses and an auxiliary convex lens, plates arranged in front and rear of said disks and provided with eye-openings, one disk of each pair provided with counterbored openings, lens-holder bases set into and rotatable in said counterbored openings, lens-holders carried by said bases, and graduated confining-rings arranged flush with the plates and engaging and confining the lens-holder-carrying bases, substantially as described.

In testimony whereof I have hereunto set my hand in presence of two subscribing witnesses.

WILLIAM B. BROWN.

Witnesses:
　GEO. W. REA,
　WILLIAM T. JONES.